United States Patent [19]

Blanchard et al.

[11] Patent Number: 4,931,419

[45] Date of Patent: Jun. 5, 1990

[54] CATALYST FOR THE CONVERSION OF VEHICULAR EXHAUST GASES AND PROCESS FOR PREPARING THE CATALYST

[75] Inventors: Gilbert Blanchard, Le Plessis Belleville; Francois Garreau, Paris; Michel Prigent, Rueil Malmaison; Richard Dozieres, Beynes, all of France

[73] Assignee: Pro-Catalyse, Rueil Malmaison Cedex, France

[21] Appl. No.: 260,718

[22] Filed: Oct. 21, 1988

[30] Foreign Application Priority Data

Oct. 21, 1987 [FR] France ................. 87 14519

[51] Int. Cl.$^5$ .............. B01J 23/10; B01J 23/40; B01J 35/04
[52] U.S. Cl. ............................. 502/304; 502/302; 502/303; 502/325; 502/338; 502/339; 502/349; 423/213.5

[58] Field of Search ............. 502/339, 302, 303, 304, 502/325, 338, 349; 423/213.5

[56] References Cited

U.S. PATENT DOCUMENTS

| | | | |
|---|---|---|---|
| 4,053,434 | 10/1977 | McArthur | 502/325 X |
| 4,152,301 | 5/1979 | Summers et al. | 502/334 X |
| 4,374,103 | 2/1983 | Gandhi et al. | 502/313 X |
| 4,448,756 | 5/1984 | Hammerle et al. | 502/339 X |
| 4,552,733 | 11/1985 | Thompson et al. | 423/213.5 |

*Primary Examiner*—W. J. Shine
*Attorney, Agent, or Firm*—Burns, Doane, Swecker & Mathis

[57] ABSTRACT

Improvedly time-stable catalysts adopted for the treatment of internal combustion engine exhaust gases include a monolithic catalyst support impregnated with a plurality of catalytically active phases, one section of the support being impregnated with a first catalytically active phase and remaining section of the support being impregnated with a second catalytically active phase.

43 Claims, No Drawings

CATALYST FOR THE CONVERSION OF VEHICULAR EXHAUST GASES AND PROCESS FOR PREPARING THE CATALYST

BACKGROUND OF THE INVENTION

1. Field of the Invention:

The present invention relates to novel catalysts for the treatment of exhaust gases from internal combustion engines and to a process for the preparation of such novel catalysts.

This invention more especially relates to novel catalysts of the type comprising a monolithic support having an active catalytic phase deposited onto the exposed surfaces thereof.

2. Description of the Prior Art:

Catalysts of the monolithic type are known to this art and include a substrate coated with a layer or film of a porous material, onto which a catalytically active phase is impregnated or deposited. These catalysts are used for the catalytic purification of the exhaust gases emanating from internal combustion engines, whether of gasoline or diesel type.

The substrate is an inert and rigid structure, designated a monolith, typically made of a ceramic or a metal.

This structure is most frequently in the form of a honeycomb containing a plurality of channels or conduits extending therethrough.

A wide variety of catalysts have been proposed to this art for the elimination of the unburned hydrocarbons, carbon monoxide, and nitrogen oxides contained in the exhaust gases of internal combustion engines.

These catalysts are either multifunctional or oxidizing catalysts. A catalyst is multifunctional if it enables the elimination of the three principal types of pollutants contained in the exhaust gases, i.e., the unburned hydrocarbons, the nitrogen oxides and carbon monoxide. A catalyst is deemed an oxidizing catalyst if it enables oxidation of unburned hydrocarbons and the carbon monoxide contained in the exhaust gases.

These catalysts, although they have sufficient activity in certain instances to satisfy the environmental standards prevailing in such countries as the United States, Japan and in Europe, share the major disadvantage of possessing a catalytic activity which declines during their lifespan in a catalytic converter.

Multifunctional catalysts typically contain one or more precious metals, optionally in combination with one or more other metals, such as, for example, nickel, iron, zirconium, vanadium, chromium or cerium, deposited onto a monolithic support.

Thus, European Patent No. 27,069 describes a catalyst comprising a support of a refractory oxide and a catalytically active phase of cerium, iron and at least one metal selected from among iridium and rhodium, and another metal selected from among platinum and palladium.

European Patent No. 54,472 describes a multifunctional catalyst comprising an inert honeycomb substrate coated with a layer or film of a refractory oxide, with the active phase including copper, cerium or iron, at least one platinum or palladium group metal and at least one metal selected from among iridium and rhodium. The active phase is uniformly deposited or impregnated onto the exposed surface of the monolithic support, by the total immersion of the support in a solution of the precursors of the elements constituting the active phase.

The oxidizing catalysts typically contain one or more metals of the platinum type, such as platinum and palladium, and, optionally, one or more additional metals, such as nickel, iron, zirconium, vanadium, chromium or cerium.

Exemplary are the catalysts described in European Patents Nos. 100,267 and 145,584, assigned to the assignee hereof.

Also exemplary of the multifunctional or oxidizing catalysts are those described in European Patents Nos. 60,740, 126,676 and 170,588, also assigned to the assignee hereof.

SUMMARY OF THE INVENTION

Accordingly, a major object of the present invention is the provision of improved catalysts of the type comprising a monolithic support and different catalytic phases selectively deposited onto distinct sites of the monolithic support. Such catalysts display excellent activity and remarkable stability over prolonged periods of time, and do not lose such activity even after a relatively long period of operation.

Briefly, the present invention features novel catalysts for the treatment of the exhaust gases from internal combustion engines, comprising a monolithic support onto which is deposited or impregnated a catalytically active phase, and wherein such catalysts comprise a first catalytically active phase deposited onto one portion of the useful length thereof, beginning from one end, and a second catalytically active phase deposited onto the other portion of its length.

DETAILED DESCRIPTION OF THE PREFERRED EMBODIMENTS OF THE INVENTION

More particularly according to the present invention, by the term "catalyst" is intended a multifunctional and/or oxidizing catalyst, as hereinbefore defined.

According to this invention, the monolithic support is an inert substrate of rigid configuration, coated with a film or layer of a porous, advantageously refractory, material. This porous material, in a preferred embodiment of the invention, is a macroporous material.

As suitable such porous material, exemplary are the refractory oxides selected from among the oxides of aluminum, magnesium, calcium, strontium, barium, scandium, yttrium, lanthanides, gallium, silicon, titanium, zirconium, hafnium, thorium, niobium, tantalum, chromium, molybdenum and tungsten.

In another preferred embodiment of the invention, the refractory oxide is an aluminum oxide.

Exemplary of the aluminum oxide-based coatings suitable according to this invention are those described in European Patent No. 73,703, assigned to the assignee hereof.

Such coatings may be deposited, in particular, by immersion of the rigid substrate in a suspension of alumina or a precursor of alumina, followed by drying and calcination. It is also possible to pass a flow of the suspension of alumina or a solution of an aluminum salt through the channels of the substrate. The coatings may also be provided by the application of a layer of active alumina to the substrate, followed by calcination.

The porous coating, per se, and the process for the deposition thereof, are not critical parameters according to this invention.

Particularly preferred substrates according to the present invention are metal or ceramic substrates.

Representative substrates of a ceramic material are those containing, as their principal component, cordierite, alumina, mullite, porcelain, boron or silicon carbides.

Suitable metal substrates are, in particular, those produced from alloys of iron, nickel and chromium, or those produced from alloys of iron, chromium, aluminum and cobalt, such as those marketed under the trademark of KANTHAL, or those produced from alloys of iron, chromium, aluminum and yttrium, marketed under the trademark of FECRALLOY. The metal may also be a simple carbon steel, or cast iron.

The metal substrates based on aluminum may advantageously be pretreated by heating same in an oxidizing atmosphere under conditions of duration and temperature which enable formation, from the aluminum contained in the alloy, of a surface coating of aluminum oxide. Carbon steels or cast iron may also be pretreated by annealing them, after coating, with an aluminum layer, to produce a coating comprising a diffused aluminum/iron layer.

The structure of the rigid substrate is advantageously a cellular honeycomb structure, which may be in the hexagonal, tetragonal, triangular or corrugated form; it must permit the passage of gas through the channels or conduits formed during the manufacture thereof, whether by extrusion, rolling, solidification of the elements in the form of foil, and the like.

The porous coatings according to the invention are advantageously also treated such as to provide them with good thermal stability over the course of time. These treatments, which are well known to this art, in particular entail a stabilization of the alumina particles or the aluminum oxide coating by alkaline earth metals, silicon and/or the rare earths.

The catalytically active phases suitable for this invention are based on the precious metals selected from among platinum, palladium, rhodium, iridium.

It is envisaged to utilize a combination of such metals.

In one embodiment of the invention, the catalytically active phases contain nonprecious metals, designated "additional" metals, selected from among nickel, iron, zirconium, vanadium, chromium, cerium, tungsten, manganese, tin, germanium, cobalt, uranium, rhenium, and the rare earths.

In a preferred embodiment, at least one precious metal including Pt, Pd, Rh and Ir is deposited onto less that the entirety of the exposed surface of the catalyst support and at least one different metal or precious metal is deposited onto an exposed surface of the catalyst support not occupied by the at least one precious metal.

In another preferred embodiment, at least one metal including Ni, Fe, Zr, V, Cr, W, Mn, Sn, Ge, Co, U, Re and a rare earth ("RE") is deposited onto less than the entirety of the exposed surface of the catalyst support and at least one different metal or precious metal is deposited onto an exposed surface of the catalyst support not occupied by said at least one metal.

In another embodiment of the invention, the additional metals may be deposited onto the porous support of the monolithic catalyst, uniformly and over the entire surface of the catalyst, or over only a part of said surface, with the other part being impregnated by another metal or with a precious metal only.

These additional metals, if they are homogeneously present on the catalyst, may be mixed into the alumina solution prior to the application of the porous support onto the monolithic substrate whereby such elements common to the first and second catalytically active phases are simultaneously impregnated into the catalyst support.

Of course, they may also be deposited by immersion of the coated support substrate into a precursor solution of such metals, or by pouring said solution into the channels, followed by the calcination of the entire assembly.

If the metals are not applied homogeneously over the surface of the support, the process used for their incorporation is advantageously that described hereinafter for the incorporation of the precious metals.

This invention also features a process for the preparation of the subject novel catalysts, i.e., catalysts of monolithic type, but incorporating different catalytically active phases over different sections of the useful volume thereof.

In general, the process of the invention enables a first deposition of certain elements onto a monolithic support structure, in a controlled manner, over one portion of the length of such support to thereby simultaneously impregnate the catalyst support with a plurality of elements constituting the first catalytically active phase, and a second deposition of other elements, or of the same elements in different concentrations, over the remaining portion of the support to thereby simultaneously impregnate the catalyst support with a plurality of elements constituting the second catalytically active phase.

The process of the invention comprises, successively:

(i) soaking one end of the monolithic support structure in a predetermined volume of a solution of a precursor of at least one element constituting the first catalytically active phase to be impregnated;

(ii) manipulating and turning the monolithic support to permit such solution to flow over and impregnate a predetermined length of the support;

(iii) soaking the other end of the support in a solution of a precursor of at least one element constituting the second catalytically active phase to be impregnated;

(iv) manipulating and turning the support to permit said second solution to flow over and impregnate remaining length of the support; and (v) drying and calcining the thus impregnated support.

By "solution of a precursor of a catalytic phase" in intended a solution of a salt or compound of such element, or of at least one of the elements constituting the catalytic phase, with said salts and said compounds being thermally decomposable.

The concentration in salt of the solution is selected as a function of the active phase to be deposited onto the support.

The surface of impregnation of the first active phase is determined by the volume of the solution adsorbed. Thus, in one embodiment of the invention, the volume of the first catalytic phase adsorbed is equal to the pore volume of the portion of the monolithic support to be impregnated.

However, the adsorbed volume of the solution of the second catalytic phase may advantageously be greater than the pore volume of the other portion of the monolithic support to be impregnated.

It is also envisaged according to the present invention, to repeat these operations using the same support after it has been dried and calcined. It is thus possible to successively deposit several elements onto the support and onto different predetermined surfaces thereof and calcine all of the impregnated elements comprising the first and second catalytically active phases during one calcining step.

The process of the invention thus enables deposition of catalytic phases differing in nature and/or concentration along the useful length of a catalyst support.

The concentration of the catalytic phases deposited onto the support are not critical.

In order to further illustrate the present invention and the advantages thereof, the following specific examples are given, it being understood that same are intended only as illustrative and in nowise limitative.

EXAMPLE 1

Preparation of a catalyst support with a monolithic structure

An alumina binder and filler were prepared according to the process described in European Patent No. 73,703.

The alumina binder (I) was prepared by the following process:

5,000 g alumina obtained by the dehydration of hydrargillite in a stream of hot gas at 800° C. were introduced into an autoclave containing a nitric acid solution. The suspension was heated under agitation for 4 h at 189° C. The resulting suspension, which constituted the alumina binder (I), was dried by atomization at 150° to produce a powder exhibiting, upon X-ray examination, a fibrillar boehmite structure.

A portion of this powder was calcined in air at 600° C. for two hours to produce an alumina filler (II).

200 g of the alumina binder (I) were dispersed in powder form in two liters of water and, after agitation, 800 g of the alumina filler (II) were added. After agitation, a suspension was produced for coating a ceramic monolithic honeycomb structure, having 62 cells per $cm^2$. This structure was immersed in the above suspension, containing 30% by weight alumina. After draining and drying the monolithic structure in order to completely empty the channels thereof, the structure was calcined at 600° C. for 3 h.

In this manner, a monolithic support was produced, which was impregnated with the catalytic phases.

EXAMPLE 2

Catalyst (A) according to the invention

A monolithic 1.98 liter support, coated as in Example 1, was immersed in an aqueous solution of cerium nitrate to deposit, after calcination, 6% by weight cerium relative to the porous substrate and the alumina support.

In this manner, the cerium was distributed uniformly over the entire surface of the support.

Consistent herewith, the precious metals are deposited in a differential manner onto the monolithic support.

The support was thus impregnated by soaking one face in 169 ml of an aqueous solution of hexachloroplatinic acid. Following the total adsorption of the solution, the support was turned to permit the impregnated solution to flow into a predetermined portion of said support.

The other face of the support was then immersed in 169 ml of an aqueous solution of rhodium nitrate. Following adsorption of the solution, the support was again turned to permit flow of the solution adsorbed in this manner.

The catalyst of monolithic structure was then dried at 150° C. and activated by calcination.

The catalyst prepared in this manner contained, overall and by weight relative to the monolithic catalyst, 0.200% platinum, 0.010% rhodium and 6% cerium.

However, in the first section of the catalyst (approximately 50% of its total length), the active phase had the following composition relative to the total weight of this section of the monolithic catalyst:
Ce: 6%
Pt: 0.40%
while in the other section, the active phase had the following concentration:
Ce: 6%
Rh: 0.02%

EXAMPLE 3

Catalyst (B) according to the invention

A catalyst support was impregnated by immersing the monolithic structure, having a volume of 0.933 l and coated as in Example 1, in an aqueous solution of cerium nitrate and zirconyl nitrate, with concentrations such that after immersion and calcination, the monolith contained 6% by weight of cerium and 2% by weight zirconium.

The monolithic support was then impregnated over a portion of its length by immersion of one of its ends in 96 ml of an aqueous solution of hexahydroplatinic acid, containing 0.5 g platinum.

The structure was then turned over to permit the impregnated solution to flow over the desired length.

The other end was then immersed in 64 ml of an aqueous solution of rhodium trichloride and palladium nitrate, containing 0.05 g rhodium and 0.5 g palladium.

The support was then turned to permit the rhodium and palladium solution to flow into the pores that were not filled by the first platinum solution.

The assembly was then dried and calcined as in Example 2.

The catalyst (B) prepared in this manner contained, by weight relative to the total catalyst, 0.10% platinum, 0.010% rhodium, 0.10% palladium, 6% cerium and 2% zirconium.

However, on the first section of the catalyst, representing 60% of its length, the composition of the catalytic phase was:
0.166% Pt, 6% Ce, 2% Zr
while on the other section of its length, the catalytic phase had the following composition:
0.025% rhodium
0.25% palladium
6% cerium
2% zirconium
(concentrations expressed by weight of the element relative to the total weight of the particular section of the monolithic catalyst under consideration).

EXAMPLE 4

Catalyst (C) according to the invention

A catalyst support was impregnated by immersion of the monolithic structure, having a volume of 0.933 l and coated as in Example 1, into an aqueous solution of cerium nitrate and ferric nitrate, the concentrations of which were such that, after immersion and calcination, the monolith contained 6% by weight cerium and 2% by weight iron.

The monolithic support was then impregnated over a part of its length by immersing one of its ends in 80 ml of an aqueous solution of hexahydroxyplatinic acid, containing 10 g platinum.

The structure was then turned to permit the flow of the impregnated solution over the desired length.

The other end was then immersed in 80 ml of an aqueous solution of rhodium trichloride, containing 0.05 g rhodium.

The support was then turned to permit the rhodium solution to flow into the pores not filled by the first platinum solution.

The assembly was then dried and calcined as in Example 2.

The catalyst (C) prepared in this manner contained, by weight relative to the entirety of the catalyst, 0.20% platinum, 0.010% rhodium, 6% cerium and 2% iron.

However, on the first section of the catalyst, representing 50% of its length, the composition of the catalytic phase was:
0 0.4% Pt, 6% Ce, 2% Fe
while on the other section of its length, the catalytic phase had the following composition:
0.02% rhodium
6% cerium
2% iron
(concentrations expressed as in the preceding example).

EXAMPLE 5

Catalyst (D) according to the prior art

A 0.933 liter monolithic support was impregnated with an aqueous solution of cerium and zirconium, as in Example 3. After immersion and calcination, the monolith contained 6% by weight of cerium and 2% by weight zirconium.

The monolithic support was then immersed in 160 ml of an aqueous solution of hexahydroxyplatinic acid, hydrated rhodium trichloride and palladium nitrate, containing 0.25 g platinum, 0.025 g rhodium and 0.25 g palladium.

The catalyst was then treated as in Example 3.

The catalyst (D) prepared in this manner contained, by weight relative to the monolithic catalyst, 0.10% platinum, 0.010% rhodium, 0.1% palladium, 6% cerium and 2% zirconium, distributed uniformly over the surface of the support.

EXAMPLE 6

Activities of different catalysts measured in a test vehicle

The present example reports the results obtained using a test vehicle according to U.S. standards, and the different catalysts (A), (B), (C) and (D), respectively described in Examples 2 to 5, after aging for 800 h on a test bench engine. The results are reported in Table I.

The monolithic catalysts were mounted in welded metal envelopes and installed along the exhaust line of the engine. The monolithic catalysts according to the invention were placed in a manner such that the sections impregnated with the first impregnating solution corresponded to the inlet of the exhaust gases into the catalyst.

Aging was carried out by placing the catalytic converter at a distance of 0.70 m from the outlet of the cylinder head of an automotive engine equipped with a dynamometric brake. The engine used was a RENAULT Type J7T.718 engine having a cylinder displacement volume of 2,165 cm$^3$, fed by electronic fuel injection (BOSCH L-Jetronic system with richness regulation by oxygen probe).

The operating cycle of the engine during aging comprised the following four phases:
I—6 min idling,
II—25 min at 4,000 rpm/54 hp,
III—4 min at 2,500 rpm, 25 hp,
IV—25 min at 4,000 rpm, 54 hp The temperature of the gases at the inlet to the catalytic converter was 800° to 820° C. during the phases II and IV of the cycle.

The control of the aging of the catalysts was carried out by transferring the catalytic converters to a vehicle, RENAULT FUEGO USA, Model 1985, equipped with the same engine as that used in the bench aging experiments. Emission measurements were carried out on a roller bench according to the American FTP procedure described in the following article: *Federal Register*, Vol. 42, No. 124 —June 28, 1977, pages 32,906 to 33,004, Title 40—"Protection of Environment", Chapter 1, Environmental Protection Agency, Part 86, "Control of air pollution from new-motor vehicles and new-motor vehicle engines".

The regulation of the hydraulic brake simulating the resistance to the advance of the vehicle on the road, according to the USA federal standard, corresponded on the roller bench to a traction force at the balance of 25 kgf at 80 km/h.

The base emissions of the vehicle without a catalytic converter were as follows:
CO: 13.6 g/mile
HC: 2.6 g/mile
NO$_x$: 3.3 g/mile

TABLE I

Emissions of carbon oxide (CO), hydrocarbons (HC) and nitrogen oxides (NO$_x$) measured on a vehicle according to the American FTP 75 cycle, expressed in grams per mile

| | Example | Catalyst | Emission after aging the catalyst on a bench engine for 800 h (g/mile) | | |
|---|---|---|---|---|---|
| | | | Co | HC | NO$_x$ |
| Invention | 2 | A | 3.12 | 0.35 | 0.70 |
| | 3 | B | 3.37 | 0.39 | 0.85 |
| | 4 | C | 3.05 | 0.33 | 0.75 |
| Prior Art | 5 | D | 6.80 | 1.30 | 1.10 |

It will be seen that the stability of the activity of multifunctional catalysts prepared according to the invention is improved relative to that of a multifunctional catalyst prepared according to the prior art.

EXAMPLE 7

Catalyst (E) according to the invention

A 1.98 l monolithic support coated as in Example 1 was immersed in an aqueous solution of cerium nitrate to deposit, after calcination, 6% cerium relative to the porous substrate and the alumina support.

The cerium was thus distributed uniformly over the entire surface of the support.

Consistent herewith, the precious metals are deposited differentially over the monolithic support.

The support was impregnated by immersion of one face in 169 ml of an aqueous solution of hexachloroplatinic acid, containing 0.8 g platinum. After the total adsorption of the solution, the support was turned to permit the impregnated solution to flow over a predetermined volume of the support.

Subsequently, the other face of the support was immersed in 169 ml of an aqueous solution of hexachloroplatinic acid and of palladium chloride, containing 0.2 g platinum and 1 g palladium. Following the adsorption of the solution, the support was again turned to permit flow of the solution adsorbed in this manner.

The catalyst having a monolithic structure was then dried at 150° C., and activated by calcination.

The catalyst (D) prepared in this manner contained, in total and by weight relative to the monolithic catalyst, 0.1% platinum, 0.1% palladium and 6% cerium.

However, in the first section of the catalyst (approximately 50% of its total length), the active phase had the following composition relative to the total weight of this section of the monolithic catalyst.

distance of 0.85 m from the cylinder head. The monolithic catalysts prepared according to the invention were placed in a manner such that the sections impregnated with the first impregnating solution corresponded to the inlet of the exhaust gases into the catalyst.

The control of the effectiveness of the catalysts was carried out upon completion of the testing by transferring the converters to another test bench engine comprising a device capable of varying the temperature of the gases at the converter inlet without modifying the engine settings. The conversion of the pollutants was determined by analysis of the gases upstream and downstream of the catalytic converter, for gas temperatures of from 300° to 550° C.

Table II reports the results obtained using the catalysts (E) and (F) after approximately 1,000 hours of operation (volumetric flow rate of the gases = 29,500 $h^{-1}$).

TABLE II

| | | | | Temperature (°C.) | | | | | | |
|---|---|---|---|---|---|---|---|---|---|---|
| | Example | Catalyst | Pollutants | 300 | 325 | 350 | 400 | 450 | 500 | 550 |
| Invention | 7 | E | CO | 6 | 70 | 94 | 95 | 95 | 95.5 | 95.5 |
| | | | HC | 2 | 35 | 67 | 76 | 80 | 84 | 85.5 |
| Prior art | 8 | F | CO | 0 | 0 | 22 | 89 | 90 | 91 | 91.5 |
| | | | HC | 0 | 0 | 10 | 57.5 | 66 | 71 | 75.5 |

Ce: 6%
Pt: 0.16%
while in the other section, the active phase had the following composition:
Ce: 6%
Pt: 0.04%
Pd: 0.2%

EXAMPLE 8

Catalyst (F) according to the prior art

The monolithic catalyst was prepared by immersion of the support in a cerium nitrate solution to obtain, as in Example 6 and after calcination, a monolithic support containing 6% cerium by weight.

This impregnated support was then immersed in an aqueous solution of hexachloroplatinic acid and of palladium chloride.

The catalyst obtained, after calcination, contained 0.1% platinum, 0.1% palladium and 6% cerium. The catalytic phase had a homogeneous composition over the entire surface of the catalyst.

EXAMPLE 9

Longevity of the catalysts (E) and (F) relative to the oxidation of carbon monoxide and unburned hydrocarbons in the exhaust gases of an engine in bench tests The engine used for these tests was a RENAULT R20 Type 843/20 engine having a total cylinder displacement of 1,647 cm$^3$, equipped with secondary air injection by means of Pulsair flaps.

The fuel consumed by the engine in the tests was no-lead gasoline containing a residual lead content adjusted in all cases to 0.013 g/l. With the engine coupled to a dynamometric brake, the revolutions per minute and the load placed on the engine were regulated such as to carry out the cycle described in Example 6.

The fuel and ignition controls were those specified by the manufacturer.

The monolithic catalysts were mounted in welded metal envelopes and installed along the exhaust line at a It will be seen that the stability of the activity of the oxidizing catalyst prepared according to the invention is appreciably improved relative to that of the oxidizing catalyst prepared according to the prior art.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A catalyst adapted for the treatment of internal combustion engine exhaust gases, comprising a monolithic catalyst support impregnated with a plurality of catalytically active phases comprising a first catalytically active phase and a second catalytically active phase, one section of said support being impregnated with said first catalytically active phase which includes at least one rare earth and another section of said support being impregnated with said second catalytically active phase which includes at least one rare earth.

2. The catalyst as defined by claim 1, said monolithic catalyst support comprising a rigid substrate having a network of channels therethrough.

3. The catalyst as defined by claim 2, said rigid substrate having a layer of porous material deposited thereon.

4. The catalyst as defined by claim 3, said porous material comprising macroporous material.

5. The catalyst as defined by claim 3, said porous material comprising alumina.

6. The catalyst as defined by claim 1, said first and/or second catalytically active phase comprising at least one precious metal including platinum, palladium, rhodium and iridium.

7. The catalyst as defined by claim 1, said first and/or second catalytically active phase further comprising at least one metal including nickel, iron, zirconium, vanadium, chromium, tungsten, manganese, tin, germanium, cobalt, uranium and rhenium.

8. The catalyst as defined by claim 6, said first and/or second catalytically active phase further comprising at least one metal including nickel, iron, zirconium, vanadium, chromium, tungsten, manganese, tin, germanium, cobalt, uranium and rhenium.

9. The catalyst as defined by claim 7, said at least one metal being deposited onto the entirety of the exposed surface of the catalyst support.

10. The catalyst as defined by claim 6, said at least one precious metal being deposited onto less than the entirety of the exposed surface of the catalyst support.

11. The catalyst as defined by claim 7, said at least one metal being deposited onto less than the entirety of the exposed surface of the catalyst support.

12. The catalyst as defined by claim 10, wherein at least one different metal or precious metal is deposited onto exposed surface of the catalyst support not occupied by said at least one precious metal.

13. The catalyst as defined by claim 11, wherein at least one different metal precious metal is deposited onto exposed surface of the catalyst support not occupied by said at least one metal.

14. The catalyst as defined by claim 1, said first and said second catalytically active phases comprising differing concentrations of the same catalytically active metals and/or precious metals.

15. The catalyst as defined by claim 1, comprising at least one multifunctional catalytically active phase.

16. The catalyst as defined by claim 1, comprising at least one oxidizing catalytically active phase.

17. The catalyst as defined by claim 1, said catalyst support comprising a ceramic.

18. The catalyst as defined by claim 1, said catalyst support comprising a metal.

19. The catalyst as defined by claim 1, said catalyst support comprising a honeycomb.

20. The catalyst as defined by claim 3, said porous material comprising a refractory material.

21. The catalyst as defined by claim 20, said refractory material comprising aluminum oxide.

22. A process for the preparation of a catalyst adapted for the treatment of internal combustion engine exhaust gases, comprising a monolithic catalyst support impregnated with a plurality of catalytically active phases, one section of said support being impregnated with a first one of the catalytically active phases and another section of said support being impregnated with a second one of the catalytically active phases, comprising the steps of:
(i) immersing said one section of the monolithic catalyst support in a predetermined volume of a first solution of a precursor of at least one element of said first catalytically active phase, the predetermined volume of said first solution being equal to the pore volume of the catalyst support impregnated thereby;
(ii) manipulating said catalyst support such that said first solution is adsorbed onto the exposed surface of said one section thereof;
(iii) immersing said another section of the monolithic catalyst support in a second solution of a precursor of at least one element of said second catalytically active phase, the volume of said second solution being at least equal to the pore volume of the catalyst support impregnated thereby;
(iv) manipulating said catalyst support such that said second solution is adsorbed onto the exposed surface of said another section; and
(v) drying and calcining the catalyst support thus impregnated.

23. The process as defined by claim 22, wherein said catalyst support is coated with a porous material, and then dried and calcined prior to the impregnation thereof.

24. The process as defined by claim 22, comprising simultaneously impregnating said catalyst support with a plurality of elements constituting one of the catalytically active phases.

25. The process as defined by claim 22, comprising successively impregnating said catalyst support with the elements constituting one of the catalytically active phases.

26. The process as defined by claim 25, comprising drying and calcining said catalyst support after each successive impregnation.

27. The process as defined by claim 22, comprising simultaneously impregnating said catalyst support with elements common to said first and said second catalytically active phase.

28. The catalyst as defined by claim 1, wherein said first catalytically active phase includes platinum and said second catalytically active phase includes platinum and palladium.

29. The catalyst as defined by claim 1, wherein said rare earth comprises cerium.

30. The catalyst as defined by claim 1, wherein said first catalytically active phase includes platinum.

31. The catalyst as defined by claim 30, wherein said second catalytically active phase includes rhodium.

32. The catalyst as defined by claim 1, wherein said first catalytically active phase and said second catalytically active phase includes zirconium.

33. The catalyst as defined by claim 1, wherein said first catalytically active phase and said second catalytically active phase includes iron.

34. The catalyst as defined by claim 1, wherein said first catalytically active phase and said second catalytically active phase comprises at least one precious metal including platinum, palladium, rhodium and iridium.

35. The process as defined by claim 22, wherein said first catalytically active phase and said second catalytically active phase includes at least one rare earth.

36. The process as defined by claim 22, wherein said first catalytically active phase and said second catalytically active phase comprises at least one precious metal including platinum, palladium, rhodium and iridium.

37. The process as defined by claim 35, wherein said first catalytically active phase and said second catalytically active phase comprises at least one precious metal including platinum, palladium, rhodium and iridium.

38. The process as defined by claim 22, wherein said first catalytically active phase and said second catalytically active phase includes zirconium.

39. The process as defined by claim 22, wherein said first catalytically active phase and said second catalytically active phase includes iron.

40. The process as defined by claim 35, wherein said first catalytically active phase includes platinum and said second catalytically active phase includes rhodium.

41. The process as defined by claim 35, wherein said first catalytically active phase includes platinum and said second catalytically active phase includes platinum and palladium.

42. The process as defined by claim 22, wherein all of the impregnated elements comprising the first and second catalytically active phases are not calcined until step (V).

43. The process as defined by claim 22, wherein the predetermined volume is effective to impregnate less than the entire pore volume of the catalyst support.

* * * * *